United States Patent [19]

Cornelius

[11] 4,403,995

[45] Sep. 13, 1983

[54] SULPHUR DYESTUFFS, A PROCESS FOR THEIR MANUFACTURE AND THEIR USE FROM HYDROXY-DIPHENYLAMINE COMPOUNDS

[75] Inventor: Dieter Cornelius, Darmstadt, Fed. Rep. of Germany

[73] Assignee: Cassella Aktiengesellschaft, Frankfurt, Fed. Rep. of Germany

[21] Appl. No.: 350,116

[22] Filed: Feb. 18, 1982

[30] Foreign Application Priority Data

Apr. 7, 1981 [DE]  Fed. Rep. of Germany ....... 3114033

[51] Int. Cl.³ .......................... C09B 49/10; D06P 1/30
[52] U.S. Cl. ............................................. 8/652; 8/918;
8/924; 260/134; 544/35; 544/36
[58] Field of Search .............. 8/652; 260/134; 544/35, 544/36

[56] References Cited

U.S. PATENT DOCUMENTS

| | | | |
|---|---|---|---|
| 2,130,416 | 9/1938 | Buchanan | 8/527 |
| 2,415,363 | 2/1947 | Mitchell et al. | 544/36 |
| 2,657,112 | 10/1953 | Robinson et al. | 8/585 |
| 2,887,482 | 5/1959 | Vierlins | 544/36 |
| 3,956,332 | 5/1976 | Krusche et al. | 546/32 |

FOREIGN PATENT DOCUMENTS 52748  6/1982  European Pat. Off. .

753764  8/1956  United Kingdom .

OTHER PUBLICATIONS

Venkataraman's "The Chemistry of Synthetic Dyes", vol. VII, (Academic Press, 1974), pp. 24–25.

Primary Examiner—A. Lionel Clingman
Attorney, Agent, or Firm—Connolly and Hutz

[57] ABSTRACT

New sulphur dyestuffs are prepared by reacting sulphur with a 4-hydroxydiphenylamine of the formula

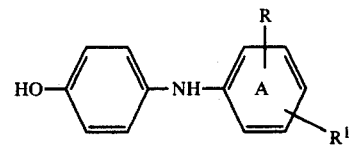

wherein R and $R^1$ denote hydrogen or alkyl having 1 to 4 carbon atoms and the nucleus A has at least one free ortho-position in relation to the imino group, in a first stage at an elevated temperature to form a thiazine compound which is then sulphurized in a second stage in a water-soluble solvent at an elevated temperature to produce the sulphur dyestuff, and wherein a molar ratio of first stage reactants of 1:(2 to 2.4) between the 4-hydroxydiphenylamine compound and sulphur is maintained.

9 Claims, No Drawings

SULPHUR DYESTUFFS, A PROCESS FOR THEIR MANUFACTURE AND THEIR USE FROM HYDROXY-DIPHENYLAMINE COMPOUNDS

The invention relates to sulphur dyestuffs which can be prepared from 4-hydroxydiphenylamines by sulphurisation in a two-stage process, to a process for their manufacture and to their use for dyeing cellulose, cellulose-containing materials and polyamide.

It is known that 4-hydroxydiphenylamine can be converted into a sulphur dyestuff by means of an alkali metal polysulphide or sulphur (German Patent Specification No. 261,651). 5.78 mols of sulphur per mol of 4-hydroxydiphenylamine are employed in this process. It is also possible to employ the corresponding thiazine (German Patent Specification No. 266,568) in the sulphurisation instead of 4-hydroxydiphenylamine.

A process is also known for the preparation of sulphur dyestuffs (German Patent Specification 679,985), in which 4-hydroxydiarylamines, for example 4'-methyl-4-hydroxydiphenylamine, are treated in a first stage with sodium sulphide and sulphur, or with sulphur alone at elevated temperatures, until a thiazine compound is formed, and the resulting product is then converted into sulphur dyestuffs in a second stage by heating in aliphatic or cyclic alcohols and, if the starting compound has been fused with sulphur alone, with the addition of an alkali metal sulphide. A considerable excess of sulphur is used in the first stage, for example the 4'-methyl-4-hydroxydiphenylamine is reacted in the first stage with 300 mol% of sulphur. Resulting dyestuffs dye cellulose in red-brown and violet to black colour shades.

In another known process (German Auslegeschrift 1,038,211), 4-hydroxydiphenylamines are converted into sulphur dyestuffs by first melting 1 part with 1.5 to 3 parts of an alkali metal polysulphide $Me_2S_x$, or with a mixture of an alkali metal sulphide and sufficient sulphur for x to have a value of 5 to 7, in the presence of water-soluble organic solvents which boil above 100° C. and water, isolating the resulting crude dyestuff and oxidising it in an alkaline dispersion in the absence of inorganic sulphur compounds. Dyestuffs which dye cellulose in colour shades which are displaced towards the red are obtained in this process. The necessity of isolating the crude dyestuffs makes this process more expensive.

It has now been found that, starting from 4-hydroxydiphenylamines of the formula I

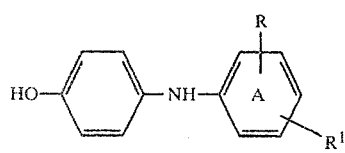

wherein R and $R^1$ independently of one another denote hydrogen or alkyl having 1 to 4 C atoms, and the nucleus A has at least one free ortho-position, it is possible to prepare, in a two-stage process, new sulphur dyestuffs which dye cellulose in yellow-brown to brown colour shades and which, compared with the dyestuffs of German Patent Specification No. 679,985, have considerably higher dyestuff yields on cellulose, better fastness to chlorine and improved solubility in aqueous solutions of alkali metal sulphide, while having very good fastness to light and good fastness to wet processing. The sulphur dyestuffs according to the invention can be prepared in a first stage by the action of sulphur on a 4-hydroxydiphenylamine of the formula I

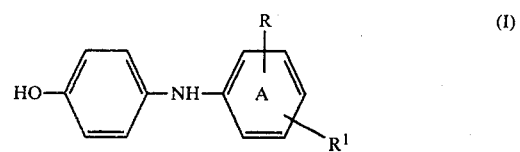

wherein R and $R^1$ denote hydrogen or alkyl having 1 to 4 C atoms, and the nucleus A has at least one free ortho-position in relation to the imino group, at an elevated temperature, with the formation of a thiazine compound, which is sulphurised in a second stage in a water-soluble solvent at an elevated temperature to give a sulphur dyestuff.

The sulphur dyestuffs according to the invention are characterised in that the molar ratio between the compound I and sulphur in the first stage is 1:(2 to 2.4), preferably 1:(2.1 to 2.3). Preferred sulphur dyestuffs are those which can be prepared from compounds of the formula I in which $R^1$ denotes hydrogen and in which, in particular, R is in the para-position.

In the process according to the invention, a compound of the formula I, preferably a compound of the formula I in which $R^1$ denotes hydrogen, and particularly a compound of this type in which R is in the para-position, is converted into a thiazine compound in a first stage with sulphur in a molar ratio of 1:(2 to 2.4), preferably 1:(2.1 to 2.3), and this thiazine compound is sulphurised in a second stage in a water-soluble solvent at an elevated temperature to give a sulphur dyestuff. The reaction temperatures in the first stage are 160° to 190° C., and the mixture of the compound I and sulphur is heated until the corresponding 3-hydroxyphenothiazine has been formed. If, as is recommended, a suitable catalyst, such as, for example, iodine, is added, the reaction times in the first stage are approx. 0.5 to 5, preferably 2 to 3, hours. A mixture of different compounds of the formula I can also be employed.

Since the 3-hydroxyphenothiazines formed in the first stage, if isolated, are readily oxidised, even as a result of contact with air, to give phenothiazones which, on sulphurisation, produce dyestuffs having a lower affinity for cellulose, it is appropriate not to isolate the intermediate product formed in the first stage, but to sulphurise it further, immediately, in the second stage.

The sulphurisation in the second stage is carried out at temperatures of 130° to 150° C., preferably 135° to 140° C., in a water-soluble organic solvent. Suitable water-soluble organic solvents which permit reflux temperatures of 130° to 150° C. to be reached are, for example, cyclic alcohols, such as cyclohexanol, glycols or, in particular, glycol ethers which correspond, for example, to the formula II $$R^2O\text{---}[CH_2\text{---}CH_2\text{---}O]_n\text{---}H \qquad (II)$$

wherein $R^2$ denotes hydrogen, methyl, ethyl or propyl and n denotes a number from 1 to 4. The following are examples of suitable glycols and glycol ethers: ethylene glycol, diethylene glycol, tetraethylene glycol or the monomethyl or monoethyl ether of ethylene glycol, diethylene glycol, triethylene glycol or tetraethylene glycol. It is also possible to use mixtures of water-soluble solvents, for example a technical solvent mixture known as "ethylpolyglycol", which consists of approx. 70% of ethyldiethylene glycol, 20% of ethyltriethylene glycol and 10% of ethyltetraethylene glycol.

An alkali metal polysulphide $Me_2S_m$ wherein Me denotes an alkali metal, in particular sodium, and m denotes a number from 3 to 4.5, is used for sulphurisation in the second stage. 1 to 1.5, preferably 1.1 to 1.2, mols of $Me_2S_m$ are used per mol of starting material of the formula I in the second stage. Instead of the alkali metal polysulphide, it is also possible to use a mixture of an alkali metal sulphide, in particular sodium sulphide, and sufficient sulphur, if appropriate also mixed with a polysulphide, for the composition of the mixture to have the formula $Me_2S_m$. It is appropriate to carry out the sulphurisation in the second stage in the presence of a hydrotropic compound, for example the sodium salt of xylenesulphonic acid. In addition, it is appropriate to add to the mixture, at the start of the second stage, 0.1 to 1.0, preferably 0.5 to 0.75, mol of an alkali metal hydroxide, in particular sodium hydroxide, per mol of starting material of the formula I. The reaction times for the sulphurisation in the second stage are 5 to 48 hours, as a rule 20 to 36 hours.

In principle, the reaction mixture obtained already constitutes a liquid dyestuff which is ready for use. As a rule, the reaction mixture obtained is only diluted with water to give a standard strength and a reducing agent, in general sodium hydrosulphide, is added in order to improve its stability on storage.

The dyestuff can also be isolated in a solid form from the resulting reaction mixture. This is effected by diluting the melt obtained in the sulphurisation in the second stage with water and subjecting it to air-blowing. The dyestuff which is thus precipitated is filtered off and the dyestuff paste thus obtained is dried. The powder can be formulated to give a dyestuff in a customary manner, for example by mixing with sodium sulphate. The resulting dyestuff paste can, however, also be converted, by grinding with dispersing agents, for example with ligninsulphonates, into a finely disperse form which, after drying, can easily be re-dispersed in water. In addition, the dyestuff paste can also be converted into a water-soluble dyestuff by means of sulphites, for example by means of a mixture of sodium sulphite and sodium bisulphite.

The sulphur dyestuffs according to the invention can be reduced very readily by means of reducing agents such as are customary for the reduction of sulphur dyestuffs. They are preferably employed for dyeing vegetable fibers (cellulose) by the customary known processes for dyeing by means of sulphur dyestuffs or sulphur vat dyestuffs. For this purpose, they are converted into the soluble leuco-form, which is absorbed onto the fibres, by means of reducing agents, preferably sodium dithionite, sodium sulphide or sodium hydrogen sulphide, or possibly also by means of sodium formaldehyde-sulphoxylate, glucose or organic mercapto compounds, such as, for example, thioglycerol or thioglycollic acid. The dyestuffs which are present in a liquid, ready-to-use form contain the soluble leuco-form and reducing agents and can also be used for dyeing the said fibres without adding a further quantity of reducing agents.

After the dyestuffs have been absorbed onto the fibres, the leuco-form of the sulphur dyestuffs according to the invention is converted back into the insoluble form of the sulphur dyestuff in a customary manner, for example by "hanging" the dyeings in the air or by oxidation using oxidising agents, such as, for example, hydrogen peroxide or an alkali metal dichromate, chlorite or iodate. The sulphur dyestuffs which can be prepared in accordance with the invention dye cellulose in full shades of yellow-brown, brown and red-brown, which have very good fastness to light and good fastness to wet processing, in particular good fastness to chlorine.

The dyestuffs according to the invention are superior, for example in affinity for cellulose, and in solubility in aqueous alkali metal sulphide solution, to the dyestuffs which are known from German Patent Specification No. 679,985 and German Auslegeschrift No. 1,038,211. Polyamide can also be dyed in a customary manner with the sulphur dyestuffs according to the invention. Depending on the reducing agent and the quantity of dyestuff employed, bluish-tinged brown colour shades are obtained on this fibre.

In the examples which follow, unless otherwise specified, percentages are percentages by weight.

EXAMPLE 1

A mixture of 185 g (1 mol) of 4-hydroxydiphenylamine, 70.4 g (2.2 mols) of sulphur and 0.5 g of iodine is heated at 180° C. for 1½ hours. 185 g of diethylene glycol monoethyl ether, 25 g (0.625 mol) of sodium hydroxide (in the form of an approx. 30% strength aqueous solution), 74 g of sodium p-xylenesulphonate, 150 g of 60% strength technical disodium sulphide and 98.5 g of sulphur are then added to the melt while it is still hot. The mixture is heated in an open vessel, with the evolution of water, until the reaction mass has reached a temperature of 138° to 140° C. It is then heated under reflux at this temperature for 24 hours. Cooling and diluting with water and an aqueous solution of sodium hydrosulphide gives 1,850 g of an aqueous solution of a dyestuff which is ready for dyeing and which dyes cellulose in full yellowish-tinged brown shades of very good fastness properties, and which is stable for at least 1 year when stored at a temperature in the range between −10° and 50° C.

EXAMPLE 2

A mixture of 199 g (1 mol) of 4'-methyl-4-hydroxydiphenylamine, 73.6 g (2.3 mols) of sulphur and 0.4 g of iodine is heated at 160° C. for 1 hour, at 170° C. for 1 hour and at 180° C. for 1 hour. 200 g of "ethylpolyglycol" (a technical solvent mixture consisting of approx. 70% of ethyldiethylene glycol, approx. 20% of ethyltriethylene glycol and approx. 10% of ethyltetraethylene glycol) and 20 g (0.5 mol) of sodium hydroxide (in the form of an approx. 30% strength aqueous solution) are then added to the melt while it is still hot. This mixture is added to a solution of sodium polysulphide which has been obtained by heating 74 g of sodium p-xylenesulphonate, 156 g of 60% strength technical disodium sulphide and 96 g of sulphur in 111 cc of water at 90° to 95° C. The mixture is heated, with removal of water by evaporation, until the reaction mass has reached a temperature of 135° to 137° C. It is then heated under reflux for 36 hours at this temperature. Cooling and diluting with water and an aqueous solution of sodium hydrosulphide gives 1,850 g of an aqueous solution of a dyestuff which is ready for dyeing and which dyes cellulose in full reddish-tinged brown shades of very good fastness properties, and which is stable for at least 1 year when stored at a temperature in the range between −10° and 50° C.

The 4-hydroxydiphenylamines indicated in the table which follows can also be reacted in accordance with the above examples to give new sulphur dyestuffs which dye cellulose in the colour shades indicated.

| Starting compound of the formula I | Colour shade of the new sulphur dyestuff on cellulose |
|---|---|
| 4-Hydroxy-2'-methyldiphenylamine | yellowish-tinged brown |
| 4-Hydroxy-3'-methyldiphenylamine | reddish-tinged brown |
| 4-Hydroxy-4'-ethyldiphenylamine | reddish-tinged brown |
| 4-Hydroxy-4'-propyldiphenylamine | reddish-tinged brown |
| 4-Hydroxy-4'-butyldiphenylamine | reddish-tinged brown |
| 4-Hydroxy-2',4'-dimethyldiphenylamine | yellowish-tinged brown |
| 4-Hydroxy-2',5'-dimethyldiphenylamine | yellowish-tinged brown |
| 4-Hydroxy-3',4'-dimethyldiphenylamine | yellowish-tinged brown |

What is claimed is:

1. Sulphur dyestuff prepared by first producing a thiazine by reacting sulphur with a 4-hydroxydiphenylamine of the formula

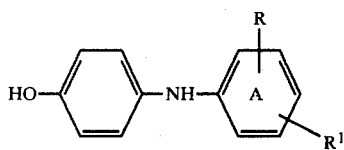

at a temperature from 160° to 190° C. with a molar ratio of 4-hydroxydiphenylamine to sulphur being from 1:(2 to 2.4) and wherein R and R¹ are hydrogen or alkyl having 1 to 4 carbon atoms and the ring nucleus A has at least one free ortho-position in relation to the imino moiety, and then sulphurizing said thiazine compound in a water-soluble solvent at a temperature from 130° to 150° C. to produce the sulphur dyestuff.

2. The sulphur dyestuff according to claim 1 wherein the molar ratio between the 4-hydroxydiphenylamine compound and sulphur is 1:(2.1 to 2.3).

3. The sulphur dyestuff according to claim 1 or claim 2 wherein R¹ is hydrogen and R is in the para-position to the imino moiety.

4. The process according to claim 2 wherein the molar ratio in the first stage is 1:(2.1 to 2.3).

5. Process according to claim 2 or claim 4 wherein the thiazine intermediate product obtained in the first stage is sulphurized at a temperature from 130° to 150° C. in the second stage by an alkali metal sulphide, an alkali metal polysulphide $Me_2S_m$ wherein Me is an alkali metal and m is a number from 3 to 4.5, or a mixture of said sulphide and said polysulphide, and sufficient sulphur for the composition to correspond to the formula $Me_2S_m$ with 1 to 1.5 moles of $Me_2S_m$ being used per mole of 4-hydroxydiphenylamine compound.

6. The process according to claim 2 wherein the thiazine product formed in the first stage is sulphurized immediately in the second stage without being isolated.

7. The process according to claim 2 wherein the second stage sulphurization is conducted in the presence of 0.1 to 1.0 mole of an alkali metal hydroxide for each mole of 4-hydroxydiphenylamine reacted in the first stage.

8. In the process of dyeing cellulose, cellulose-containing materials or polyamides with a sulphur dyestuff, the improvement comprises said sulphur dyestuff being a dyestuff according to claim 1.

9. In the process for preparation of sulphur dyestuffs comprising a first stage wherein a 4-hydroxydiphenylamine of the formula

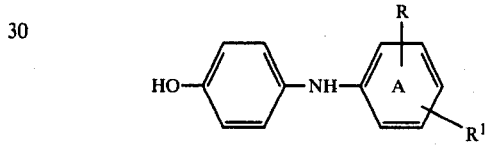

is reacted with sulphur at a temperature from 150° to 190° C. to produce a thiazine compound and wherein R and R¹ are hydrogen or alkyl having 1 to 4 carbon atoms and the ring nucleus A has at least one free ortho-position in relation to the imino moiety;

and then in a second stage sulphurizing said thiazine compound in a water-soluble solvent at a temperature from 130° to 150° C. to produce sulphur dyestuffs, the improvement comprises the molar ratio between the 4-hydroxydiphenylamine compound and sulphur in the first stage is 1:(2 to 2.4).

* * * * *

UNITED STATES PATENT AND TRADEMARK OFFICE
CERTIFICATE OF CORRECTION

PATENT NO. : 4,403,995
DATED : SEPTEMBER 13, 1983
INVENTOR(S) : DIETER CORNELIUS

It is certified that error appears in the above-identified patent and that said Letters Patent is hereby corrected as shown below:

Column 6, line 36, change "150°" to -- 160° --.

Signed and Sealed this

Twenty-seventh Day of March 1984

[SEAL]

Attest:

GERALD J. MOSSINGHOFF

Attesting Officer   Commissioner of Patents and Trademarks